(12) United States Patent
Gevargis

(10) Patent No.: US 6,612,125 B1
(45) Date of Patent: Sep. 2, 2003

(54) SOLAR EVAPORATING COOLING SYSTEM

(76) Inventor: Yul Gevargis, 36020 32nd St. East, Palmdale, CA (US) 93550

( * ) Notice: Subject to any disclaimer, the term of this patent is extended or adjusted under 35 U.S.C. 154(b) by 0 days.

(21) Appl. No.: 10/099,057

(22) Filed: Mar. 14, 2002

Related U.S. Application Data
(60) Provisional application No. 60/275,672, filed on Mar. 14, 2001.

(51) Int. Cl.$^7$ .................................................. F28D 5/00
(52) U.S. Cl. .............................. 62/310; 62/314; 62/304; 62/298; 62/259.1
(58) Field of Search ......................... 62/314, 310, 304, 62/298, 259.1

(56) References Cited

U.S. PATENT DOCUMENTS

| | | | | |
|---|---|---|---|---|
| 4,567,732 A | * | 2/1986 | Landstrom et al. ............ | 62/91 |
| 4,658,597 A | * | 4/1987 | Shum .......................... | 62/235.1 |
| 6,182,453 B1 | * | 2/2001 | Forsberg ....................... | 62/125 |
| 6,422,030 B1 | * | 7/2002 | Calvert ......................... | 62/314 |

* cited by examiner

Primary Examiner—William C. Doerrler
Assistant Examiner—Mark Shulman
(74) Attorney, Agent, or Firm—Frank L. Zugelter

(57) ABSTRACT

An improved swamp cooler (10) in which a D.C. motor (43), a D.C. water pump (40), a storage battery (68), and solar panel (62) are utilized to operate apparatus (10) in a self-sustaining mode without the necessity of a separate electrical source to operate the D.C. motor (43), water pump (40). Solar panel (62) provides the energy source for D.C. motor (43) and water pump (40) by means of electronic circuitry (60). When solar energy is not available to solar panel (62), battery (68) in apparatus (10) provides such energy, it being recharged during utilization of solar panel (62), so that apparatus (10) continues to operate under clear skies or non-clear skies.

10 Claims, 2 Drawing Sheets

SOLAR EVAPORATING COOLING SYSTEM

This invention is related to provisional application No. 60/275,672, filed Mar. 14, 2001.

TECHNICAL FIELD

This invention is directed to utilization of solar energy from solar and/or ultra-violet rays and an alternate self-sustaining source, and in particular, to a cooling apparatus and humidifying air by supplying power to its motor, while energizing a storage battery (or batteries) which acts as a back-up energy source for the apparatus during cloudiness and at night or in darkness, while utilizing exclusively D.C. current for the apparatus and its components.

BACKGROUND TO THE INVENTION a) Prior art teachings disclosing solar powered sources are disclosed in U.S. Pat. Nos. 6,253,563, 6,029,462, 5,826,435, 5,182,921, 4,011,731.

b) Swamp coolers have been part of the art to which this invention pertains and which have been operated on A.C. and 60 cycle voltage. In other words, in the past voltage and current were supplied by an outside source such an electrical wall outlet in a building or elsewhere from a like outlet. This invention's operation is self-contained in its apparatus without the need for such an outside electrical source.

SUMMARY OF THE INVENTION

The cooling apparatus includes in the inventive concept a solar panel that transmits its energy, gathered from out in space when solar energy is capable of being received, as in a non-cloudy environment, through electronic connections or lines to operate a D.C. motor within a cage, a D.C. water pump and a storage battery or batteries the latter also being recharged by the electronic circuitry during a non-cloudy environment. The invention utilizes prior art teachings of a bladed fan attached to the D.C. motor's shaft in a circumferentially arrangement thereabouts to propel air flowing through the apparatus to a venting assembly which is a customarily associated with a "swamp-cooler" well known in the art. The electronic circuitry includes the D.C. motor, the storage battery (or batteries), solar panels which receive solar energy from space, an electrically-operated D.C. water pump, and a main or toggle switch which turns on and off the circuitry to the operation of the apparatus. The purpose of the entire apparatus functions in the same general manner as does a known "swamp cooler" device.

An object of this invention is to provide an improved cooling apparatus.

Another object of the invention is to provide a cooling apparatus that is self-sustaining in its operation for achieving an air flow humidified environment in its operation.

A still further object of the invention is to provide a cooling apparatus having available to it constant energy sources at its command when in operation during sunlight periods and during dark periods such as night time and cloudiness or darkness, without the need to rely on a separate electrical source of energy.

These and other objects and advantages of the invention will become more apparent from a full and complete reading of the following description, its appended claims, and the accompanying drawing comprising two (2) sheets of four (4) FIGURES.

BRIEF DESCRIPTION OF THE DRAWING

FIG. 3 is a schematic view of components interiorly disposed of the apparatus.

FIG. 4 is a perspective schematic view of one of the state-of-the-art cooling pads utilized in the apparatus and in its operation.

BEST MODE FOR CARRYING OUT THE INVENTION

Figure 1:
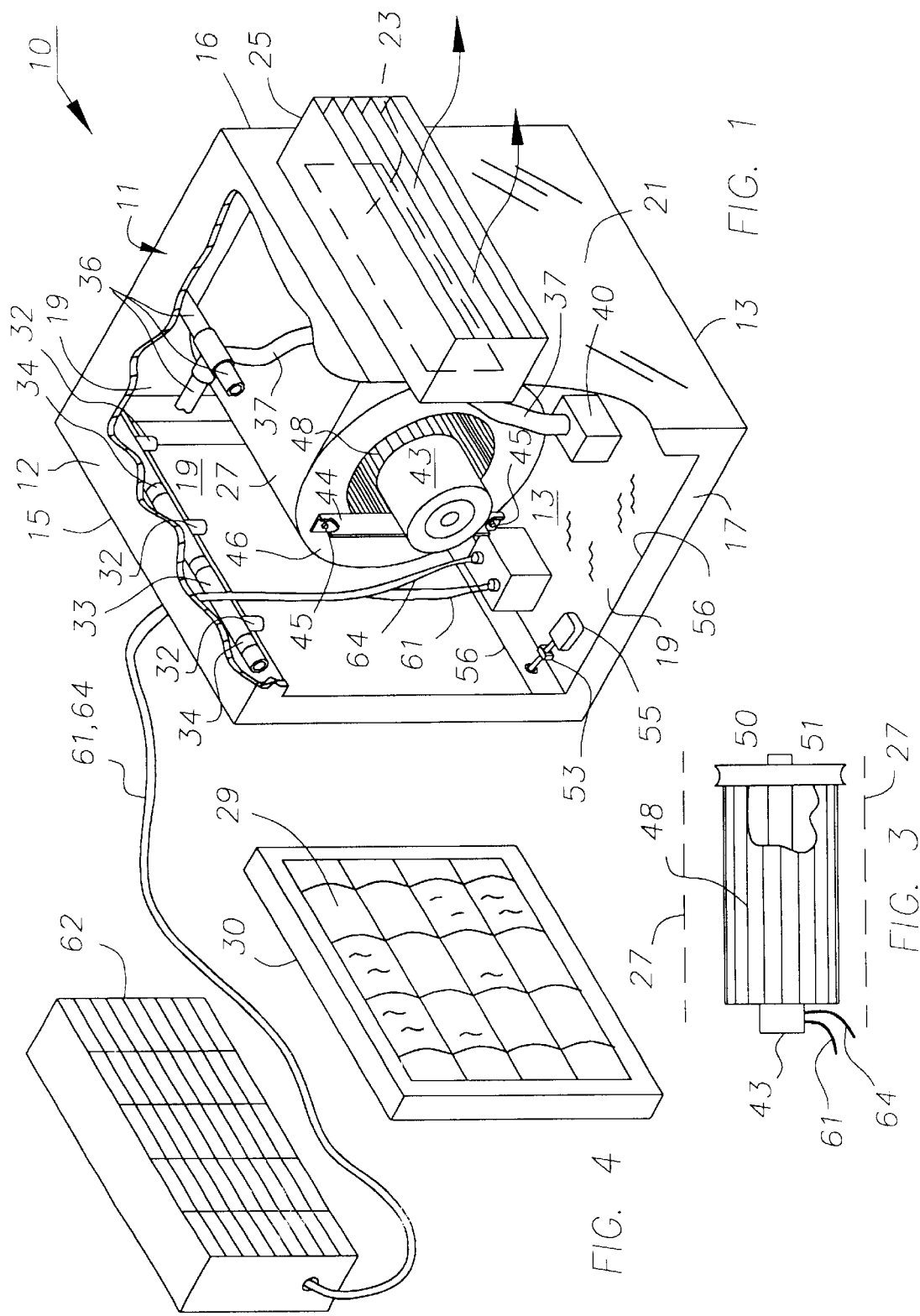
FIG. 1 is a perspective view of an apparatus employing the invention, partly broken away.

Referring now to the drawing wherein reference characters therein refer to like numerals hereinafter, FIG. 1 discloses an apparatus 10 embodying the invention. Apparatus 10 is a state-of-the-art "swamp cooler" manufactured and sold by Adobe air, Inc. AZ 85034, Model # RW 3000, except for the hereinafter description directed to the invention and its elements by which the swamp cooler is improved in accordance with the inventive concept of the invention. To the extent necessary for an understanding of the invention, a brief description of the company s apparatus 10 follows. Apparatus 10 includes a framed housing 11, rectangular in nature, having top and bottom full panels 12, 13, three (3) panels 15, 16, 17, each having an opening 19, and one full panel 21 with its opening 23 for communication with a vent box 25 securely connected thereto so that humidified air flows from apparatus 10 through box 10 into a room or the like (not shown). It is to be understood that apparatus 10 suitably mounts to the outside wall of a building, with vent box 25 suitably securely mounted to panel 21 about its opening, the vent box 25 being disposed within a room or the like of the building in an actual application of apparatus 10, in accordance with local, etc., building codes all of which is not part of the inventive concept. The opening 23 also is in communication with a cage 27 securely mounted to the interior wall of panel 21. Modular-type cooling pads 29, FIG. 4 are removably mounted and held in place in the corresponding opening 19 of its respective panel 15, 16, 17 in a customary manner as done in known swamp coolers. One such cooling pad 29 is illustrated in FIG. 4, having a frame 30 in which strands, such as straw, fibrous material or the like, are disposed for gravitational flow of water through them in the operation of apparatus 10. Nozzles 32 are included in each of three (3) conduits 33 supported by suitable means such as clips 34, FIG. 1, secured to the underside of top panel 12, with each conduit 33 connected to its connecting conduit 36 that extends to underneath the top panel of housing 37 where a fitting (not visible) connects the conduits 36 to a hose or other conduit 37 leading to an electrically operated water pump 40 suitably securely mounted on a floor 41 of bottom panel 13 of apparatus 10. A D.C. motor 43, FIGS. 1, 3, is securely mounted to cage 27 by means of a flanged member 44 bolted as at 45 to a flange 46 integrated formed on the one end of cage 27. Flanged member 44 is welded (not visible) in turn to a point on the housing of D.C. motor 43. A bladed fan 48 circumscribes D.C. motor 43 within the confines of cage 27, and held in its position by a spider-like member 50 secured by attached to the one end of the rotatable shaft 51 of D.C. motor 43.

An ordinary check-valve float mechanism 53 is suitably secured to floor 41 and provides for a supply of water to within housing 11 upon its floor 41 when its valve is opened and which occurs as the float 55 of mechanism 53 reaches a low point of water level on floor 41 below the housing's frame edges 56. With water flowing into and through mechanism 53 the water level reaches a height at which float 55 at such height closes the valve in mechanism 53 so that the height of the water level does not exceed the height of edges 56.

Figure 2:
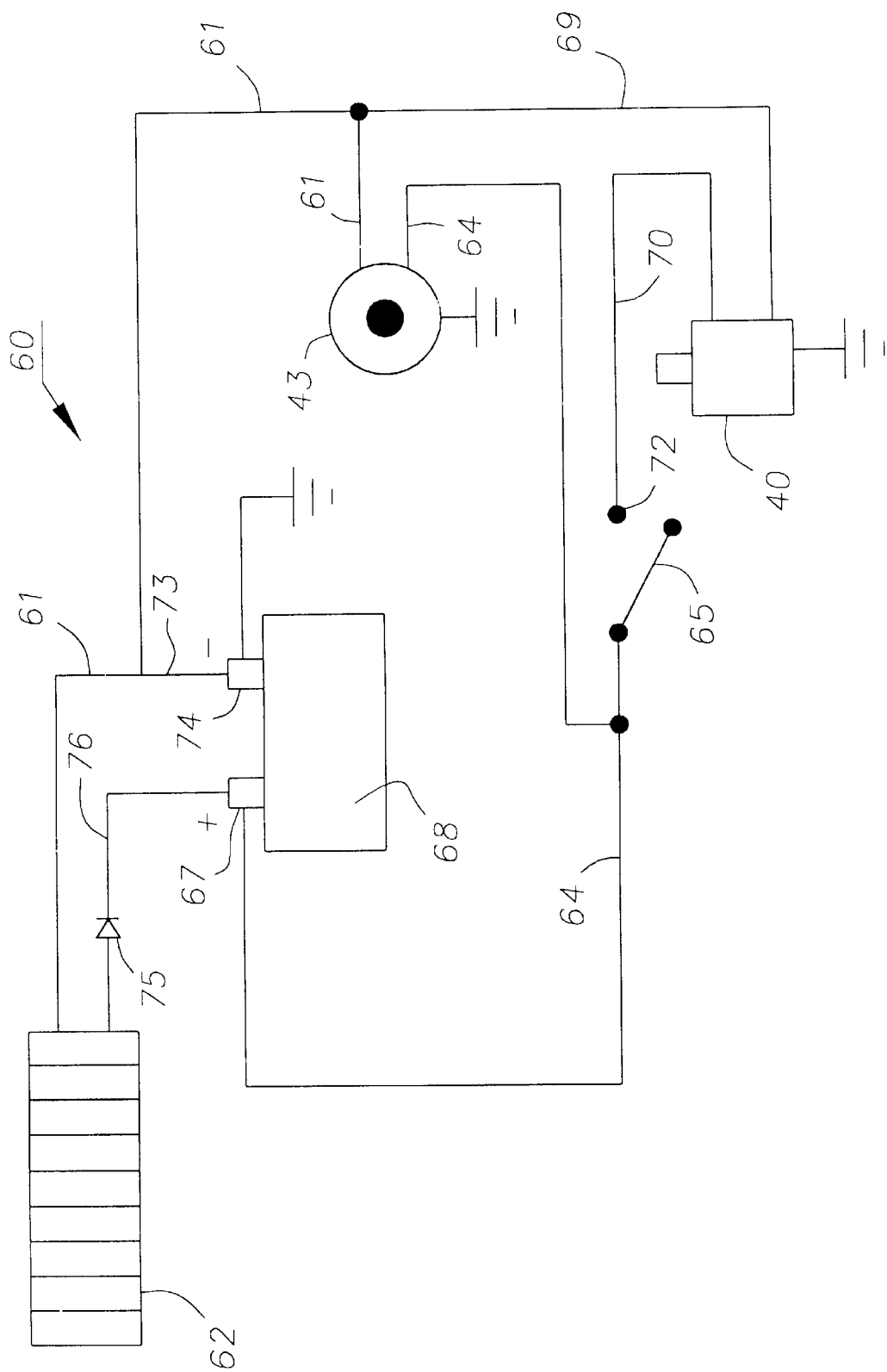
FIG. 2 is a schematic diagram of an electronic circuitry for operation of the invention.

Turning to FIG. 2 which illustrates an electronic means 60, electrical line 61 connects solar panel 62 to D.C. motor 43 which in turn is electrically connected through a line 64 to one side of a toggle switch 65, line 64 along for connection to the positive terminal 67 of a storage battery 68, FIGS. 1, 2. An electrical line 69 connects D.C. water pump 40 to D.C. motor 43 while an electrical line 70 connects its other side to the contact point 72 of toggle switch 65 which controls the actuation and shut-down of electronic circuitry 60. Water pump 40 is connected by line 69 to D.C. motor 43, to battery 68 and to solar panel 62 via electrical lines 61, 69. A line 73 extends from line 61 to the negative terminal 74 of battery 68 and diode 75 is included in a line 76 to solar panel 62 to block or prevent current from returning to solar panel 62 through line 76.

In operation, with switch 65 closed on its contact point 72, solar panel 62, provides energy battery 68, to D.C. motor 43 and to D.C. water pump 40 simultaneously. Thus, the excess energy from solar panel 62 continues to energize battery 68. Upon cloudiness or a dark environment in air space, battery 68 operates motor 43 and water pump 40, in absence of the opening of toggle switch 65. Diode 75 prevents current flow from returning to solar panel 62 in either situation.

An example of an apparatus that carries out the practice of the invention includes the following elements:

a) solar panel (62) is a 16 volt 7.1 AMP photovoltaic module;
b) 10 AMP blocking diode (75)
c) 70 AMP HR 12 V D.C. battery (68)
d) ¼ HP 5 AMP 800 RPM., 12V D.C. motor (43)
e) 12V D.C. waterpump (40) 0.5 AMP

INDUSTRIAL APPLICABILITY

The apparatus of the invention is applicable in environments in which humidified air is sought by a man-made device.

I claim:

1. A swamp-cooler apparatus comprising a housing having at least one open-sided wall panel, a full bottom panel having a floor, frame edges extending from said full bottom panel to form said at least one open-sided wall panel, another wall panel with opening for mounting a vent box and through the opening for flow to the exterior of said housing, a motor in said housing in a cage therein and to the shaft of which a bladed fan is connected, cooling pad means in said housing mounted proximate to said at least one open-sided wall panel, conduit means in said housing for distributing water to said cooling pad means, pump means mounted on the floor for pulling accumulated distributed water into said conduit means, storage battery means for said apparatus, said motor being of a D.C. nature, said pump means comprising a D.C. water pump, and means for electronically connecting together said solar panel means, D.C. motor, storage battery means, and D.C. pump means, means in said connecting means to prevent current from reversing its flow to said solar panel means, and float-valve means securely mounted in said housing at or below said frame edges whereby its valve closes upon its float reaching a water level approximating height of said frame edges upon water being supplied through said float-valve means and opens upon its float lowering at a water level below such height so that a sufficient supply of water is always provided for pulling by said D.C. pump means into said distributing means and into said cooling pad means, whereby in operation of said apparatus said solar panel means supplies energy through said connecting means to operate said D.C. motor and said pump means when solar energy is being transmitted to said solar panel means and said storage battery means supplies energy through said connecting means to operate said D.C. motor and D.C. pump means when solar energy is not being transmitted to said solar panel means, so that humidified air flows from the housing of the swamp cooler through the opening for the vent in such operation.

2. The apparatus of claim 1 including switching means to start and end operation of the apparatus and contained in said connecting means.

3. The apparatus of claim 2 wherein said switching means is an electrical toggle switch.

4. The apparatus of claim 1 including a venting box into which the humidified air flows from the cage for the D.C. motor and is discharged therefrom.

5. The apparatus of claim 4 including switching means to start and end operation of the apparatus and contained in said connecting means.

6. The apparatus of claim 1 including a plurality of open-sided wall panels and cooling pad means mounted in said housing proximate to corresponding ones of said open-sided wall panels, said conduit means in said housing corresponding in number to the plurality of said cooling pad means for distributing water to said plurality of said cooling pad means.

7. The apparatus of claim 2 including a plurality of open-sided wall panels and cooling pad means mounted in said housing proximate to corresponding ones of said open-sided wall panels, said conduit means in said housing corresponding in number to the plurality of said cooling pad means for distributing water to said plurality of said cooling pad means.

8. The apparatus of claim 3 including a plurality of open-sided wall panels and cooling pad means mounted in said housing proximate to corresponding ones of said open-sided wall panels, said conduit means in said housing corresponding in number to the plurality of said cooling pad means for distributing water to said plurality of said cooling pad means.

9. The apparatus of claim 4 including a plurality of open-sided wall panels and cooling pad means mounted in said housing proximate to corresponding ones of said open-sided wall panels, said conduit means in said housing corresponding in number to the plurality of said cooling pad means for distributing water to said plurality of said cooling pad means.

10. The apparatus of claim 5 including a plurality of open-sided wall panels and cooling pad means mounted in said housing proximate to corresponding ones of said open-sided wall panels, said conduit means in said housing corresponding in number to the plurality of said cooling pad means for distributing water to said plurality of said cooling pad means.

* * * * *